(12) United States Patent
Coladonato et al.

(10) Patent No.: US 8,135,712 B1
(45) Date of Patent: Mar. 13, 2012

(54) POSTING QUESTIONS FROM SEARCH QUERIES

(75) Inventors: Greg Coladonato, Palo Alto, CA (US); Huacheng Ke, Beijing (CN)

(73) Assignee: Google Inc., Mountain View, CA (US)

( * ) Notice: Subject to any disclaimer, the term of this patent is extended or adjusted under 35 U.S.C. 154(b) by 412 days.

(21) Appl. No.: 12/163,854

(22) Filed: Jun. 27, 2008

(51) Int. Cl.
G07F 7/00 (2006.01)
G07F 17/30 (2006.01)
G06F 15/16 (2006.01)

(52) U.S. Cl. ......................... 707/730; 707/766
(58) Field of Classification Search .................. 707/730, 707/766
See application file for complete search history.

(56) References Cited

U.S. PATENT DOCUMENTS

| | | | |
|---|---|---|---|
| 5,933,822 A * | 8/1999 | Braden-Harder et al. | 707/5 |
| 6,601,059 B1 * | 7/2003 | Fries | 707/3 |
| 7,725,307 B2 * | 5/2010 | Bennett | 704/9 |
| 2003/0115187 A1 * | 6/2003 | Bode et al. | 707/3 |
| 2003/0220917 A1 * | 11/2003 | Copperman et al. | 707/3 |
| 2007/0214131 A1 * | 9/2007 | Cucerzan et al. | 707/5 |
| 2007/0294229 A1 * | 12/2007 | Au | 707/3 |
| 2008/0010259 A1 * | 1/2008 | Feng et al. | 707/3 |
| 2010/0100541 A1 * | 4/2010 | Tsuzuki et al. | 707/730 |

\* cited by examiner

*Primary Examiner* — Greta Robinson
*Assistant Examiner* — Brian E. Weinrich
(74) *Attorney, Agent, or Firm* — Fish & Richardson P.C.

(57) ABSTRACT

The present disclosure is directed to a system and method for posting questions from search queries. In some implementations, a method includes identifying a plurality of different questions previously searched. The previously-searched questions each include a word indicating a question. The previously-searched questions are filtered to remove one or more specified words included with the question word. At least a subset of the plurality of previously-searched questions that can be used to generate a canonical form after removing the one or more specified words are determined. The subset of previously-searched questions are ranked based, at least in part, on a frequency of submission of each previously-submitted search query in the subset. A particular one of the previously-submitted search queries in the subset is identified as representative of the subset of previously-submitted search queries based on the ranking.

21 Claims, 3 Drawing Sheets

How do I boil an egg
How can I boil eggs
How are eggs boiled
•
•
•
•

How boil eggs
How boil eggs
How eggs boil
•
•
•
•

*204*{ How do I boil eggs
How are eggs boiled
How can I boil eggs
•
•
•
•

POSTING QUESTIONS FROM SEARCH QUERIES

TECHNICAL FIELD

This invention relates to question and answer forums.

BACKGROUND

Content delivery over the internet continues to improve every day. Computer users can receive e-mail, news, games, entertainment, music, books, and web pages—all with a simple Internet connection (and with improved quality on a broadband connection). Internet users also have access to a plethora of services such as maps, shopping links, images, blogs, local search, satellite images, group discussions, hosted content, and e-mail. When an Internet user accesses these respective services, the content provided by the service is typically related to a particular topic that can, for example, be divided up into various content categories. By determining the category of content provided to an internet user on a particular service, a service provider can present the Internet user questions and answers focused on the category desired by the user, thus improving the user's experience.

SUMMARY

The present disclosure is directed to a system and method for posting questions from search queries. In some implementations, a method includes identifying a plurality of different questions previously searched. The plurality of previously-searched questions each include a word indicating a question. The plurality of previously-searched questions are filtered to remove one or more specified words included with the question word. At least a subset of the plurality of previously-searched questions that can be used to generate a canonical form after removing the one or more specified words is determined. The previously-searched questions in the subset are ranked based, at least in part, on a frequency that each word in the subset was searched.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 2A to 2C are example files of FIG. 1 illustrating a ranking process; and

Like reference symbols in the various drawings indicate like elements.

DETAILED DESCRIPTION

Figure 1:
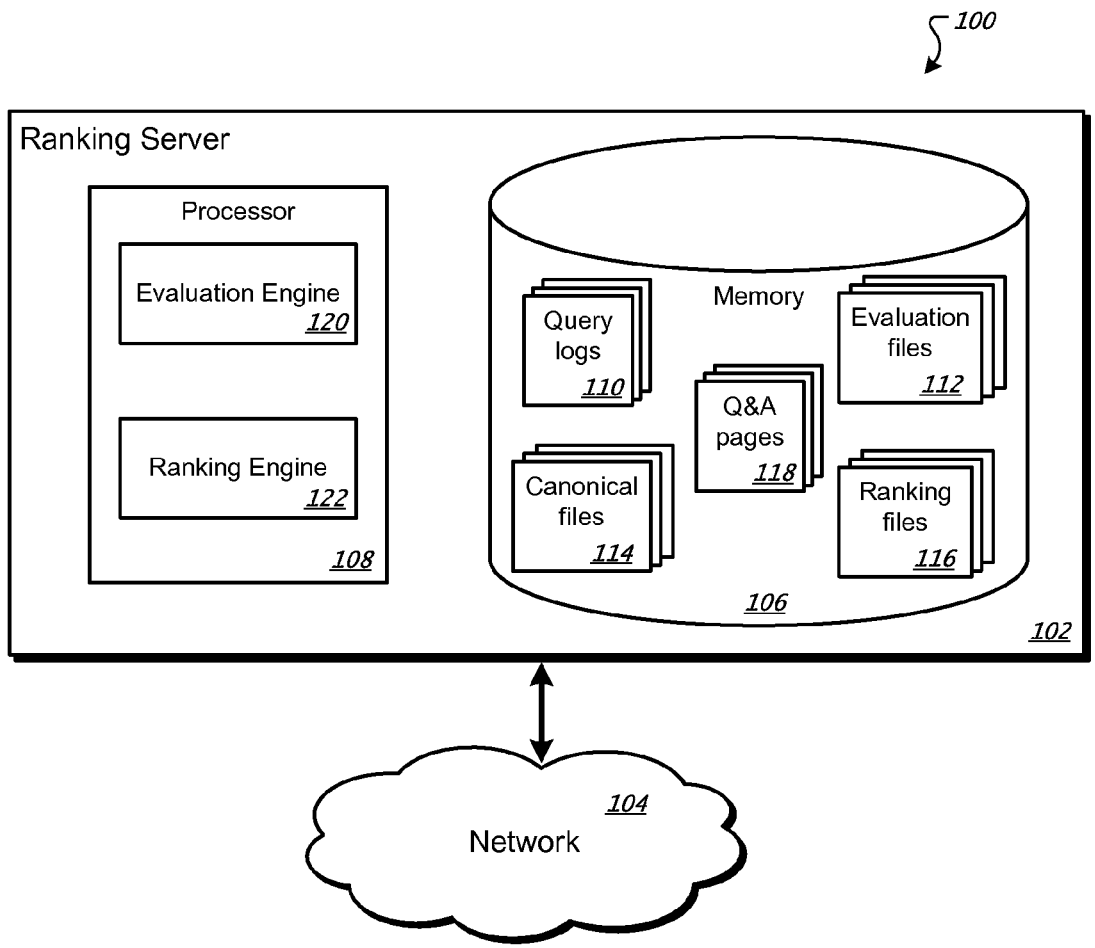
FIG. 1 is an example ranking system for identifying a representative question from related questions.

FIG. 1 is a block diagram of an example ranking system 100 for determining a question representative of a plurality of different questions. For example, the system 100 may identify a canonical form for previously-searched questions and determine a ranking based, at least in part, on a frequency for each question to determine the representative question. A canonical form of different questions typically includes a series of words that are shared or otherwise associated with a plurality of different questions. For example, the system 100 may remove words from a plurality of different questions and execute one or more operations of the different questions to determine a canonical form shared by at least a subset of the different questions. The one or more operations may include removing specified words from the questions, conjugating verbs, updating declensions of nouns, and/or other processes. As a result of executing such processes, the system 100 may determine that a plurality of different questions are related or otherwise associated with a substantially similar topic. In some implementations, the system 100 may execute one or more of the following: identify previously-searched questions; determine canonical forms of the question based on one or more processes; determine all or a set of previously-searched questions that map to a canonical form; rank order the questions mapped to the canonical form based, for example, on a frequency that each question is searched; determine a question representative of the different questions based, at least in part, on the rank; post the representative question in a Question and Answer (Q&A) forum; and/or other processes. By ranking a plurality of different questions related to a single canonical form, the system 100 may execute an algorithm to determine well-formed questions from query logs independent of manually evaluating individual questions.

In some implementations, the system 100 includes a ranking server 102 communicably coupled to a network 104. The ranking server 102 includes a memory 106 and a processor 108. The memory 106 locally stores query logs 110 that include previously-searched questions, evaluation files 112 that include instructions for converting questions to canonical forms, canonical files 114 that include canonical forms and questions used to generate the canonical forms, ranking files 116 that include rank-order questions for the canonical forms, and Q&A Web pages 118 for presenting questions and answers. The processor 108 includes an evaluation engine 120 for determining canonical forms of questions based on evaluation criteria 112 and a ranking engine 122 for ranking questions for the canonical forms and generating Q&A Web pages 118 presenting representative questions of the different questions. In some implementations, the evaluation engine 120 may identify a plurality of previously-searched questions and determine canonical forms of the identified questions based, at least in part, on the evaluation criteria 112. In addition, the evaluation engine 120 may generate or update one or more canonical files 114 based, at least in part, on the determined canonical forms and associated questions. The ranking engine 122 may rank-order questions mapped to the canonical forms based on one or more parameters (e.g., frequency), determine a representative question for a canonical form based, at least in part, on the rank order, and post the representative question in a Q&A Web page 118.

Turning to a more detailed description of the elements, the server 102 comprises an electronic computing device operable to receive, transmit, process and store data associated with system 100. System 100 can be implemented using computers other than servers, as well as a server pool. Indeed, the server 102 may be any computer, electronic or processing device such as, for example, a blade server, general-purpose personal computer (PC), Macintosh, workstation, Unix-based computer, or any other suitable device. In other words, system 100 may include computers other than general purpose computers as well as computers without conventional operating systems. The server 102 may be adapted to execute any operating system including Linux, UNIX, Windows Server, or any other suitable operating system. In certain implementations, the server 102 may also include or be communicably coupled with a web server and/or a mail server.

The server 102 includes the memory 106 and the processor 108. Memory 106 may be a local memory and include any memory or database module and may take the form of volatile or non-volatile memory including, without limitation, magnetic media, optical media, random access memory (RAM), read-only memory (ROM), removable media, or any other suitable local or remote memory component. In the illustrated implementation, the memory 106 includes the query logs 110, the evaluation files 112, the canonical files 114, the ranking files 116, and the Q&A Web pages 118, but may include other information. Local memory 106 may also include any other appropriate data such as applications or services, firewall policies, a security or access log, print or other reporting files, HTML files or templates, data classes or object interfaces, child software applications or sub-systems, and others.

The query logs 110 include one or more data structures and/or entries that include or otherwise identify previously-searched questions. For example, the query log 110 may includes search criteria used to execute a search query and that include one or more question words. Question words typically include words that may indicate a question such as, for example, who, what, where, why, when, how, how much, from where, to where, and/or others. In other words, a question word may include one or more words indicating an interrogative sentence. In addition to question words, the query log 110 may include one or more of the following: one or more words, a phrase, a number, one or more characters, a portion of a Uniform Resource Locator (URL), a name, a date, a time, a language, and/or others. For example, the query log 110 may identify a question previously searched by a search engine and a day and a time that the question was submitted. In some implementations, the query log 110 may be associated with a single search engine or multiple search engines may be associated with the query log 110. In addition, the query log 110 may be associated with a specific time period (e.g., day, week, year), specific types of queries, specific topics of queries, or other subsets of search queries. In certain implementations, the query logs 110 may be formatted, stored, or defined as various data structures in text files, eXtensible Markup Language (XML) documents, Virtual Storage Access Method (VSAM) files, flat files, Btrieve files, comma-separated-value (CSV) files, internal variables, or one or more libraries. For example, a particular query log 110 may merely be a pointer to a log stored remotely. In short, the query logs 110 may comprise one table or file or a plurality of tables or files stored on one computer or across a plurality of computers in any appropriate format. Indeed, some or all of the query logs 110 may be local or remote and store any type of appropriate data.

The evaluation files 112 include any parameters, variables, algorithms, instructions, rules, objects or other directives for determining canonical forms of questions. For example, the evaluation file 112 may determine a canonical form for different questions by removing specified words from previously-searched questions and alphabetizing the remaining words. In some implementations, the evaluation files 112 may include instructions for executing the following two processes: (1) filtering the previously-searched questions using specified criteria; and (2) modifying words remaining in the filtered questions. In regards to criteria, the evaluation file 112 may include a list of words to remove from previously-searched questions. For example, the list may include articles such as "a", "an", "the", and/or other articles, verbs such "is", "be", "can", and/or other verbs, and/or other words determined not to substantially modify a topic of a question (e.g., you, I, one). In some implementations, the system 100 may rank order words in the questions and a user may manually generate the list by identifying those words that occur above a certain frequency (e.g., 200). For example, a user may identify words above a certain frequency that are relatively meaningless compared to a topic of a question, and in response to at least the selection, the server 102 may update the evaluation file 112 with the selected words.

In regards to instructions, the evaluation file 112 may include instructions for operating on words in the previously-searched questions. In some implementations, the evaluation file 112 may include instructions for one or more of the following: updating an arrangement of words remaining in a filtered question; updating forms of remaining words in the filtered question, and/or other aspects of filtered questions. In regards to arrangement, the evaluation file 112 may include instructions to alphabetize words remaining after filtering a question. In some implementations, the evaluation file 112 may include instructions to arrange a question word first and list the remaining words alphabetically after the question word. In regards to updating a form, the evaluation file 112 may include instructions to modify an attribute of words and/or letters (e.g., font, caps). In some implementations, the evaluation file 112 may include instruction to update nouns in a question to be in a specific form (e.g., singular). In some implementations, the evaluation file 112 may include instructions to update verbs to a specified tense (e.g., present). In some implementations, the evaluation file 112 may include instructions to translate synonyms to specific word. In certain implementations, the evaluation files 112 can be formatted, stored, or defined as various data structures in text files, XML documents, VSAM files, flat files, Btrieve files, CSV files, internal variables, or one or more libraries. In short, the evaluation files 112 can comprise one table or file or a plurality of tables or files stored on one computer or across a plurality of computers in any appropriate format. Indeed, some or all of evaluation files 112 can be local or remote and store any type of appropriate data.

The canonical files 114 include one or more data entries and/or structures that at least identify canonical forms and previously-searched questions used to generate the canonical forms. For example, the canonical file 114 may include a canonical form and a plurality of different questions that were used to generate or otherwise map to the canonical form. In this case, the canonical file 114 may identify "HOW boil egg" as a canonical form and "How do I boil eggs", "How long do eggs boil", "How are eggs boiled", and others as question mapped to the canonical form. In some implementations, the canonical file 114 may include one or more of the following: a canonical form, associated questions, search dates, search times, and/or other information. In some implementations, the canonical file 114 is associated with a single canonical form or multiple canonical forms are associated with a single canonical file 114. In certain implementations, the canonical files 114 can be formatted, stored, or defined as various data structures in text files, XML documents, VSAM files, flat files, Btrieve files, CSV files, internal variables, or one or more libraries. In short, the canonical files 114 can comprise one table or file or a plurality of tables or files stored on one computer or across a plurality of computers in any appropriate format. Indeed, some or all of canonical files 114 can be local or remote and store any type of appropriate data.

The ranking files 116 can include entries and/or one or more data structures that identify ranked questions for the canonical forms. For example, the ranking file 116 may identify a canonical form and questions used to generate the canonical form that are ranked in accordance with one or more parameters. In some implementations, the one or more parameters may include: a total number of times a question was searched; a total number of searches over time; weighing factors associated with age of searches or metrics of search or search result quality; a search rate; a representative question; ranking criteria; and/or others. In some implementations, the ranking file 116 may include a canonical form and rank-order questions mapped to the canonical form. In some implementations, the ranking file 116 may include instructions and/or criteria for determining a question representative of questions used to generate a single canonical form. In some examples, the ranking file 116 may assign the question with the highest rank as the representative question for a plurality of different questions. In some implementations, the ranking file 116 may include instructions to present questions above a certain rank to a user and assign the question selected by the user as the representative question. The ranking file 116 may be associated with a single canonical form or multiple canonical forms may be associated with a single ranking file 116. In certain implementations, the ranking files 116 can be formatted, stored, or defined as various data structures in text files, XML documents, VSAM files, flat files, Btrieve files, CSV files, internal variables, or one or more libraries. In short, the ranking files 116 can comprise one table or file or a plurality of tables or files stored on one computer or across a plurality of computers in any appropriate format. Indeed, some or all of ranking files 116 can be local or remote and store any type of appropriate data.

The Web pages 118 comprise displays through which questions and associated answers can be presented to users of the clients in the network 104. In general, the Web pages 118 include any machine readable and machine storable work product that may generate or be used to generate a display through a Graphical User Interface (GUI). The Web pages 118 may be a file, a combination of files, one or more files with embedded links to other files, or any other suitable configuration. The Web pages 118 may include text, audio, image, video, animation, and other attributes. In short, Web pages 118 comprise any source code or object code for generating a display that presents questions, enables users to submit answers and embed references and search queries. The Web page 118 may be written in or based on any suitable programming language such as JavaScript.

Processor 108 executes instructions and manipulates data to perform operations of the server 102. Although FIG. 1 illustrates a single processor 108 in the server 102, multiple processors 108 may be used according to particular needs, and reference to processor 108 is meant to include multiple processors 108 where applicable. In the illustrated implementation, the processor 108 executes the evaluation engine 120 and the ranking engine 122 at any appropriate time such as, for example, in response to a request or input from a user of the server 102 or any appropriate computer system coupled with network 104.

The evaluation engine 120 can be any software configured to determine a canonical form of related questions in different forms. For example, the evaluation engine 120 may identify previously-searched questions and determine a canonical form the different questions by performing one or more operations. In some implementations, the evaluation engine 120 may execute one or more of the following: identify a plurality of previously-searched questions based, at last in part, on the query logs 110; identify a plurality of words to remove from the questions based, at last in part, on the evaluation files 112; remove the words from the identified questions; update an arrangement of the words by, for example, alphabetization; update words in the list of remaining words based one or more instructions in the evaluation files 112; and/or other processes. In some implementations, the evaluation engine 120 may identify previously-searched questions including a specific question word (e.g., how). In connection with identifying previously-searched questions, the evaluation engine 120 may remove words from the identified questions based, at least in part, on the evaluation files 112. For example, the evaluation engine 120 may remove words such as, for example, articles (e.g., a, the), specified verbs (e.g., is, be, can), and/or other words. In addition, the evaluation engine 120 may execute one or more operations on the words in the identified questions. In some implementations, the evaluation engine 120 may arrange the remaining words in a filtered question in a specified order (e.g., alphabetically). In some implementations, the evaluation engine 120 may modify or otherwise update one or more of the remaining words. The evaluation engine 120 may conjugate verbs in the remaining words to a specified tense. The evaluation engine 120 may update one or more nouns to a specific declension (e.g., plural). While operations are described as being execute after filtering the previously searched questions, the evaluation engine 120 may execute some or all operations prior to filtering the questions. Based, at least in part, on the filtered and/or modified questions, the evaluation engine 120 may generate or update one or more canonical files 114.

The ranking engine 122 can include any software, hardware, and/or firmware configured to rank questions used to generate or otherwise mapped to a canonical form. For example, the ranking engine 122 may rank order words mapped to a canonical form based, at least in part, on the search histories on the questions. In some implementations, the ranking engine 122 may execute one or more of the following: identify previously-search questions mapped to a canonical form in the query logs 110; for each of the different forms of questions, determine a total number of occurrences in the query logs 110; rank the different forms of the questions in accordance with the total number of times each question was searched in a given period; assign at least one of the ranked questions as a representative question of the different questions; post the representative question on a Q&A Web page 118; and/or other processes. In some implementations, the ranking engine 122 may identify questions that map to a canonical form based, at least in part, on the canonical files 114. In connection with identifying the canonical form, the ranking engine 122 may determine a total number of searches for each related questions based, at least in part, on the query logs 110. Based, at least in part, on the total number of searches for each question, the ranking engine 122 may rank order the different questions mapped to a canonical form from highest to lower number of searches or may identify one or more of the questions with the highest number of searches. In some implementations, the ranking engine 122 may assign a highest ranking question as a representative question for a canonical form. In some implementations, the ranking engine 122 may present questions above a threshold to a user and assign a question as a representative question for a different questions based, at least in part, on a user selection. The ranking engine 122 may post the representative question for the canonical form in a Q&A Webpage 118.

Regardless of the particular implementation, "software" may include software, firmware, wired or programmed hardware, or any combination thereof as appropriate. Indeed, the evaluation engine 120 and the ranking engine 122 may be written or described in any appropriate computer language including C, C++, Java, J#, Visual Basic, assembler, Perl, PHP, as well as others. It will be understood that while the evaluation engine 120 and the ranking engine 122 are illustrated in FIG. 1 as including individual modules, the evaluation engine 120 and/or the ranking engine 122 may include numerous other sub-modules or may instead be a single multi-tasked module that implements the various features and functionality through various objects, methods, or other processes. Further, while illustrated as internal to the server 102, one or more processes associated with evaluation engine 120 and/or the ranking engine 122 may be stored, referenced, or executed remotely. Moreover, evaluation engine 120 and/or the ranking engine 122 may be a child or sub-module of another software module or enterprise application (not illustrated).

Network 104 facilitate wireless or wireline communication between the server 102 and any other local or remote computer, such as clients 104. Network 104 may be all or a portion of an enterprise or secured network. While illustrated as single network, the network 104 may be a continuous network logically divided into various sub-nets or virtual networks, so long as at least portion of the network 104 may facilitate communications of answers and references between the server 102 and at least one client 104. In some implementations, the network 104 encompasses any internal or external network, networks, sub-network, or combination thereof operable to facilitate communications between various computing components in the system 100. The network 104 may communicate, for example, Internet Protocol (IP) packets, Frame Relay frames, Asynchronous Transfer Mode (ATM) cells, voice, video, data, and other suitable information between network addresses. The network 104 may include one or more local area networks (LANs), radio access networks (RANs), metropolitan area networks (MANs), wide area networks (WANs), all or a portion of the global computer network known as the Internet, and/or any other communication system or systems at one or more locations.

In one aspect of operation, the evaluation engine 120 may identify previously-searched questions in query logs 110 in response to an event (e.g., request, expiration of time). In connection with identifying the question, the evaluation engine 120 may identify filter criteria and instructions based, at least in part, on the evaluation files 112. For example, the evaluation engine 120 may identify a list of words to remove from the previously-search questions and instructions for executing one or more operations on the previously-search questions. In some implementations, the evaluation engine 120 may remove words specified in the evaluation file 112 and alphabetically arrange those words remaining after the removal processes. In addition, the evaluation engine 120 may conjugate verbs, update declensions of nouns, update attributes (e.g., font, caps), and/or execute other processes. In connection with evaluating the previously-searched questions, the evaluation engine 120 may identify a canonical form for a plurality of different questions and generate the canonical file 114 based, at least in part, on the canonical form and the different questions. In response to at least identifying the canonical form, the ranking engine 122 may rank the different questions used to generate the canonical form based, at least in part, on the total number of searches executed for each question. For example, the ranking engine 122 may determine a total number of searches for the different questions based, at least in part, on the query logs 110. After ranking the questions, the ranking engine 122 may identify criteria for determining a question representative of the different questions based, at least in part, on the ranking. In some examples, the ranking engine 122 may assign the highest rank as the representative question. In some examples, the ranking engine 122 may present at least a subset of the ranking to a user (e.g., top five) and assign a question as the representative question in response to at least a user selection.

FIGS. 2A to 2C illustrate example files 110, 202, and 116 for identifying a representative question based, at least in part, on previously-searched questions that map to a single canonical form. For example, the system 100 may derive a same canonical form for a plurality of different forms of questions. The illustrated files are for example purposes only, and the system 100 may processes some, all, or different information. Accordingly, the evaluation engine 120 and the ranking engine 122 may process previously-searched questions in any format or descriptive language and each file may include any appropriate information and in any layout.

Referring to FIG. 2A, the query log 110 includes a plurality of different questions previously searched. For example, the different questions may have been search by different users, at different times, at different locations, and/or by different search engines. In some implementations, the query log 110 may be generated based, at least in part, on search queries executed by a remote search engine (not illustrated). For example, the search engine may periodically transmit previously-searched questions to the server 102, and in turn, the server 102 may generate or update the query logs 110 based, at least in part, on the receive questions. In some implementations, the server 102 may identify previously-searched questions that include a specific question word and populate a query log 110 with the identified questions. In the illustrated case, the query log 110 includes previously-searched questions including the question word "How". As illustrated in FIG. 2B, the filtered questions 202 include the plurality of different questions after being filtered by the evaluation engine 120. In this case, the filtered questions 202 include the questions after removing one or more identified words. The evaluation engine 120 may identify the following words in the evaluation file 112: do, I, an, can, are, and/or other words. After identifying the removal words, the evaluation engine 120 removes the words from the different questions to generate the filtered questions 202. As previously mentioned, to identify the removal words, the server 102 may present a rank-order list of words in the previously-searched questions to enable a user to select words to remove from the questions. For example, the server 102 may present all words that occur in the questions at a rank above a certain threshold (e.g., top 200). In response to receiving selections from the user, the evaluation engine 120 may update the evaluation file 112 with the selected words. In addition, the evaluation engine 120 may perform one or more operations on the filtered questions such as arranging them according to a specific instruction (e.g., alphabetically), conjugating verbs to a specific form, updating formats of words (e.g., caps, font), updating nouns to a specified declension, and/or other operations. Once you remove all of the identified "unhelpful" words and alphabetize and perform other operations on the remaining words that come after "How", the system 100 can, in some implementations, identify questions having the same subject matter as determined by shared words. The list of canonical forms, in this implementation, may relate to questions on many different topics but by performing the various operations on an overall universe or set of questions, the system 100 may identify subsets of questions that relate to the same or essentially the same subject matter. As illustrated in FIG. 2C, the ranking files 116 include the previously-searched questions ranked based on the total number of times the questions were searched. For example, the evaluation engine 120 may generate or update the canonical file 114 with an identified canonical form and different questions that can be used to generate the canonical form using the evaluation file 112. In connection with identifying the different questions that map to the canonical form, the ranking engine 122 may determine a total number of times each question was searched based, at least in part, on the query logs 110. In some implementations, the ranking engine 122 may determine a total number over a specific period of time (e.g., day, month, year). In addition to generating one or more ranking files 116 for a canonical form, the ranking engine 122 may assign a question as a representative question 204 for the canonical form in accordance with certain criteria. For example, the ranking engine 122 may assign the highest ranking question as the representative question 204 for the canonical form. In some implementations, the ranking engine 122 may present a list of questions above a certain ranking to a user and assign the representative question 204 based, at least in part, on a selection from the user.

Figure 3:
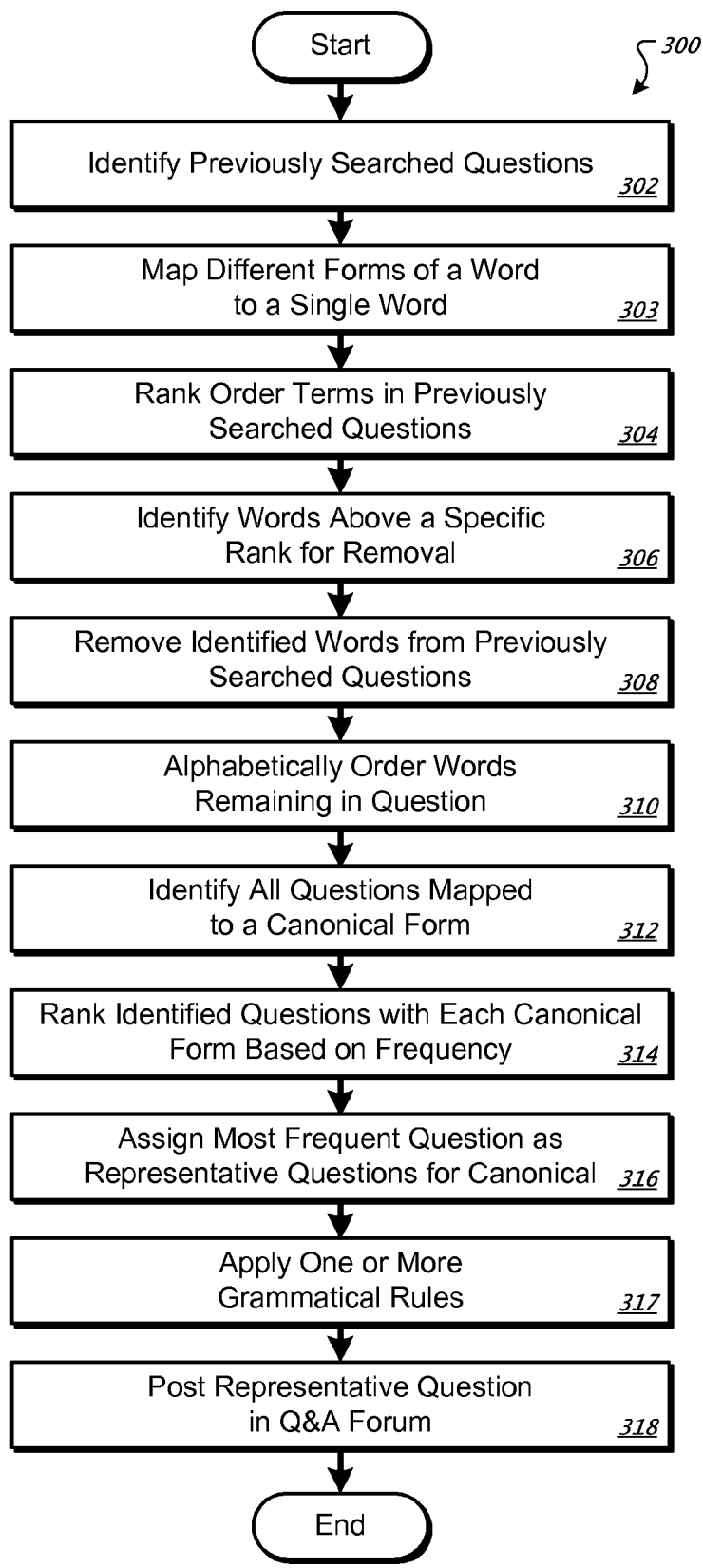
FIG. 3 is a flow chart illustrating an example method for determining a representative question using a canonical form.

FIG. 3 is a flowchart illustrating an example method 300 for determining a representative question for a plurality of related questions in accordance with some implementations of the present disclosure. Generally, the method 300 describes an example technique for determining different questions that map to a same canonical form and determining the representative question from ranking the different questions. Method 300 may use any appropriate combination and arrangement of logical elements implementing some or all of the described functionality.

The method 300 begins at step 302 where previously-searched questions are identified. For example, the evaluation engine 120 of FIG. 1 may identify a plurality of previously-searched questions in the query logs 110. In some implementations of this example, the evaluation engine 120 may identify at least a subset of the questions with a specific question word (e.g., Why). In connection with identifying the questions, different forms of a word a mapped to a single form. For example, the evaluation engine 120 may map different conjugations of a verb to a single form, different declensions of a noun to a single noun, and/or other mappings. At step 304, the words in the identified questions are rank ordered. In the example, the evaluation engine 120 may rank order all words in the identified questions and present at least a subset of the ranked words to a user such that the user selects words for removal from the identified questions. Next, at step 306, at least a subset of the words above specified rank is identified for removal. As for the example, the evaluation engine 120 may update the evaluation file 112 with the words selected by the user. The identified words are removed from the previously-searched questions at step 308. For example, the evaluation engine 120 may filter the previously-searched questions by removing the list of words identified as removal words in the evaluation file 112. In some implementations, the words removed may be meaningless words having little or substantially no effect on the topic of the question. At step 310, words remaining in the filtered questions are ordered alphabetically. Returning to the example, the evaluation engine 120 may arrange filtered questions such that the question word is first and the words following the question word are arranged alphabetically. Also in this example, the evaluation engine 120 may execute one or more additional operations on the remaining words such as, for example, conjugating verbs, updating noun declensions, and/or others.

All questions that can be used to derive a specific canonical form are identified at step 312. Again in the example, the evaluation engine 120 may determine all previously-searched questions that generate, using the evaluation files 112, a specific canonical form and generate or update one or more canonical files 114. Next, at step 314, the previously-searched questions with each canonical form are ranked based on the frequency that each question was previously searched. In the example, the ranking engine 122 may rank order the previously-searched questions of the canonical form and generate or update one or more of the following ranking files 116. At step 316, the most frequent question is assigned as a representative question for the different questions mapped to the canonical form. Returning to the example, the ranking engine 122 may assign the highest ranking question of the different questions as the representative question. One or more grammatical rules are applied to the representative question at step 317. For example, the ranking engine 122 may update a representative question to satisfy one or more grammatical rules such as ending in a question, a first letter of the question being capitalized, and/or others. At step 318, the representative question is posted in a Q&A forum. In the example, the ranking engine 122 may generate a Q&A Web page 118 including the representative question or update an existing Q&A Web page 118 with the representative question.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions tangibly stored on a computer readable storage device for execution by, or to control the operation of, data processing apparatus. In addition, the one or more computer program products can be tangibly encoded in a propagated signal, which is an artificially generated signal, e.g., a machine-generated electrical, optical, or electromagnetic signal, that is generated to encode information for transmission to suitable receiver apparatus for execution by a computer. The computer readable storage device can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method, comprising:
identifying, using at least one hardware processor, a plurality of different previously-submitted search queries;
filtering, using at least one evaluation file, the plurality of different previously-submitted search queries to remove one or more specified words from the plurality of different previously-submitted search queries to generate a plurality of filtered search queries, wherein the at least one evaluation file includes at least one of instructions or parameters for generating at least one canonical search query form of the plurality of different previously-submitted search queries;
modifying, using the at least one evaluation file, remaining words in the plurality of filtered search queries to generate a plurality of modified search queries;
determining, as search queries that map to a particular canonical search query form, a subset of the plurality of different previously-submitted search queries that are used to generate, as a result of filtering the plurality of different previously-submitted search queries and modifying the plurality of filtered search queries using the at least one evaluation file, the particular canonical search query form;
ranking the search queries that map to the particular canonical search query form based, at least in part, on a frequency of submission of each different previously-submitted search query that maps to the particular canonical search query form; and
identifying, based on the ranking, a particular one of the different previously-submitted search queries in the ranked search queries that map to the particular canonical search query form as a representative search query of the search queries that map to the particular canonical search query form.

2. The method of claim 1, wherein the plurality of different previously-submitted search queries include a plurality of previously-searched questions with each previously-searched question including a word indicating a question.

3. The method of claim 1, wherein the particular canonical search query form is based, at least in part, on the removal of the one or more specified words from the plurality of different previously-submitted search queries.

4. The method of claim 2, wherein the word indicating a question includes one or more words indicating an interrogative sentence.

5. The method of claim 1, further comprising:
ranking words included in the plurality of different previously-submitted search queries based, at least in part, on a frequency that each word occurs in the different previously-submitted search queries; and
determining the one or more words to remove from the plurality of different previously-submitted search queries based, at least in part, on the ranking of the words.

6. The method of claim 5, further comprising presenting the ranking of the words to a user, wherein the one or more words to remove are determined based, at least in part, on user selections.

7. The method of claim 1, further comprising alphabetizing words in the plurality of filtered search queries to determine the particular canonical search query form before determining the search queries that map to the particular canonical search query form.

8. The method of claim 1, further comprising conjugating verbs remaining in the plurality of different previously-submitted search queries to a specified tense prior to determining the search queries that map to the particular canonical search query form.

9. The method of claim 1, further comprising updating declensions of nouns remaining in the plurality of different previously-submitted search queries to a specified declension prior to determining the search queries that map to the particular canonical search query form.

10. The method of claim 1, further comprising:
determining a most frequently submitted different previously-submitted search query based, at least in part, on the ranking of the search queries that map to the particular canonical search query form; and
posting the most frequently submitted different previously-submitted search query in a Question and Answer (Q&A) Webpage.

11. Software for identifying related questions comprising computer readable instructions embodied on non-transitory computer-readable media, wherein the computer readable instructions are configured, when executed by a data processing apparatus, to:
identify, using at least one hardware processor, a plurality of different previously-submitted search queries;
filter, using at least one evaluation file, the plurality of different previously-submitted search queries to remove one or more specified words from the plurality of different previously-submitted search queries to generate a plurality of filtered search queries, wherein the at least one evaluation file includes at least one of instructions or parameters for generating at least one canonical search query form of the plurality of different previously-submitted search queries;
modify, using the at least one evaluation file, remaining words in the plurality of filtered search queries to generate a plurality of modified search queries;
determine, as search queries that map to a particular canonical search query form, a subset of the plurality of different previously-submitted search queries that are used to generate, as a result of filtering the plurality of different previously-submitted search queries and modifying the plurality of filtered search queries using the at least one evaluation file;
rank the search queries that map to the particular canonical search query form based, at least in part, on a frequency of submission of each different previously-submitted search query that maps to the particular canonical search query form; and identify, based on the ranking, a particular one of the different previously-submitted search queries in the ranked search queries that map to the particular canonical search query form as a representative search query of the search queries that map to the particular canonical search query form.

12. The software of claim 11, wherein the plurality of different previously-submitted search queries include a plurality of previously-searched questions with each previously-searched question including a word indicating a question.

13. The software of claim 11, wherein the particular canonical search query form is based, at least in part, on the removal of the one or more specified words from the plurality of different previously-submitted search queries.

14. The software of claim 12, wherein the word indicating a question includes one or more words indicating an interrogative sentence.

15. The software of claim 11, wherein the computer readable instructions are further configured, when executed by the data processing apparatus, to:
rank words included in the plurality of different previously-submitted search queries based, at least in part, on a frequency that each word occurs in the different previously-submitted search queries; and
determine the one or more words to remove from the plurality of different previously-submitted search queries based, at least in part, on the ranking of the words.

16. The software of claim 15, wherein the computer readable instructions are further configured, when executed by the data processing apparatus, to present the ranking of the words to a user, wherein the one or more words to remove are determined based, at least in part, on user selections.

17. The software of claim 11, wherein the computer readable instructions are further configured, when executed by the data processing apparatus, to alphabetize words in the plurality of filtered search queries to determine the particular canonical search query form before determining the search queries that map to the particular canonical search query form.

18. The software of claim 11, wherein the computer readable instructions are further configured, when executed by the data processing apparatus, to conjugate verbs remaining in the plurality of different previously-submitted search queries to a specified tense prior to determining the search queries that map to the particular canonical search query form.

19. The software of claim 11, wherein the computer readable instructions are further configured, when executed by data processing apparatus, to update declensions of nouns remaining in the plurality of different previously-submitted search queries to a specified declension prior to determining the search queries that map to the particular canonical search query form.

20. The software of claim 11, wherein the computer readable instructions are further configured, when executed by the data processing apparatus, to:
determine a most frequently submitted different previously-submitted search query based, at least in part, on the ranking of the search queries that map to the particular canonical search query form; and
post the most frequently submitted different previously-submitted search query in a Question and Answer (Q&A) Webpage.

21. A system for identifying related questions, comprising:
at least one hardware server including:
an evaluation engine configured to:
identify a plurality of different previously-submitted search queries;
filter, using at least one evaluation file, the plurality of different previously-submitted search queries to remove one or more specified words from the plurality of different previously-submitted search queries to generate a plurality of filtered search queries, wherein the at least one evaluation file includes at least one of instructions or parameters for generating at least one canonical search query form of the plurality of different previously-submitted search queries;
modify, using the at least one evaluation file, remaining words in the plurality of filtered search queries to generate a plurality of modified search queries; and
determine, as search queries that map to a particular canonical search query form, a subset of the plurality of different previously-submitted search queries that are used to generate, as a result of filtering the plurality of different previously-submitted search queries and modifying the plurality of filtered search queries using the at least one evaluation file, the particular canonical search query form; and
a ranking engine configured to:
rank the search queries that map to the particular canonical search query form based, at least in part, on a frequency of submission of each different previously-submitted search query that maps to the particular canonical search query; and
identify, based on the ranking, a particular one of the different previously-submitted search queries in the ranked search queries that map to the particular canonical search query form as a representative search query of the search queries that map to the particular canonical search query form.

* * * * *

UNITED STATES PATENT AND TRADEMARK OFFICE
CERTIFICATE OF CORRECTION

| | | |
|---|---|---|
| PATENT NO. | : 8,135,712 B1 | Page 1 of 1 |
| APPLICATION NO. | : 12/163854 | |
| DATED | : March 13, 2012 | |
| INVENTOR(S) | : Greg Coladonato | |

It is certified that error appears in the above-identified patent and that said Letters Patent is hereby corrected as shown below:

In Column 12, Line 62, delete "file;" and insert -- file, the particular canonical search query form; --, therefor.

In Column 13, Line 46, delete "by" and insert -- by the --, therefor.

Signed and Sealed this
Twenty-sixth Day of June, 2012

David J. Kappos
*Director of the United States Patent and Trademark Office*